United States Patent Office 2,796,427
Patented June 18, 1957

2,796,427

METHOD OF PRODUCING 2.4.5. TRICHLORO-PHENOXYALKANECARBOXYLIC ACIDS OR ESTERS THEREOF

Henderikus Obias Huisman, Weesp, Netherlands, assignor, by mesne assignments, to North American Philips Company, Inc., New York, N. Y., a corporation of Delaware No Drawing. Application May 12, 1953, Serial No. 354,657

Claims priority, application Netherlands May 14, 1952

3 Claims. (Cl. 260—473)

The invention relates to a method of preparing selective weed-killing compounds and in particular to the preparation of halogenated phenoxyalkane carboxylic acids and salts and esters thereof.

In accordance with the invention, these selective weed-killers are produced by halogenating directly a 2,5-dichlorophenoxyalkane carboxylic acid or an ester thereof. More particularly, it has been found that chlorine, under suitable conditions, can be caused to react with 2,5-dichlorophenoxyalkane carboxylic acid to form 2,4,5-trichlorophenoxyalkane carboxylic acid which can be converted to a salt or an ester of the acid. Preferably, the chlorine is passed into a solution of 2,5-dichloro-phenoxyalkanecarboxylic acid dissolved in an organic polar liquid such as acetic acid or nitrobenzene.

The invention will be described further in connection with the following examples which are illustrative only and limiting of the invention which is defined in the claims forming part of this specification.

*Example I*

22 gr. of 2,5-dichlorophenoxy-acetic acid (obtained by converting a raw hexachlorocyclohexane mixture, from which the γ-isomer had been extracted as much as possible, into 1,2,5-trichlorobenzene, by converting the latter then by means of alcoholic alkalihydroxide into 2,5-dichlorophenol and by causing the latter to react with a monohalogenated acetic acid, for example, monochloro acetic acid) was dissolved in 100 ccs. of warm acetic acid, after which 7.1 gr. of chlorine was introduced within about 10 minutes into the solution obtained. Then the liquid was heated to the boiling point and water was added until the liquid became turbid. After cooling the liquid with the precipitation produced therein was left for 10 hours at room temperature, after which the precipitation was filtered off and dried. The 2,4,5-trichlorophenoxyacetic acid was thus obtained in a substantially pure state (melting point 153° C.) with a yield of 95% of the theoretical one.

*Example II*

22.1 gr. of 2,5-dichlorophenoxy-acetic acid was dissolved in 200 ccs. of nitrobenzene of 100° C. Into this solution 7.1 gr. of chlorine was introduced within about 20 minutes, after which the mixture was heated for another 20 minutes at 100° C. Then a possibly large quantity of nitrobenzene was distilled off in vacuo and the remainder was recrystallized from a mixture of benzene and petroleum ether. The yield was 16.7 gr. of 2,4,5-trichlorophenoxy-acetic acid (i. e. 65% of the theoretical yield) the melting point was 153° C.

*Example III*

Into a warm solution of 24.9 gr. of 2,5-dichlorophenoxyacetic acid ethyl ester in 100 ccs. of warm acetic acid 7.1 gr. of chlorine was introduced within about 20 minutes. After cooling the solution was diluted by 500 ccs. of water and extracted by means of ether. The ethereal extract was washed with water until the washing water reacted substantially neutrally. Then the extract was dried with sodium sulphate. The solvent was then distilled off. The remainder, which hardens at room temperature, was recrystallized from petroleum ether. The yield was 23 gr. of 2,4,5-trichlorophenoxyacetic ethyl ester (i. e. 81% of the theoretical yield), having a melting point of 67 to 68° C.

*Example IV*

Into a solution of 24.9 gr. of 1-(2'5', dichlorophenoxy)-1-methylpropionic acid in 100 ccs. of warm acetic acid 7.1 gr. of chlorine was introduced within about 20 minutes. The mixture was heated to the boiling point and diluted with water until the liquid became turbid. After one night at room temperature the precipitation obtained was filtered off and recrystallized from petroleum ether. The yield was 20.5 of 1-(2'4'5'-trichlorophenoxy)-1-methylpropionic acid (i. e. 72% of the theoretical yield), having a melting point of 92 to 93° C.

While we have described our invention in connection with specific embodiments and applications, other modifications thereof will be readily apparent to those skilled in this art without departing from the spirit and scope of the invention as defined in the appended claims.

What is claimed is:

1. A method of producing 2,4,5-trichlorophenoxyalkane carboxylic acids and aliphatic esters thereof comprising the steps, dissolving an aromatic compound selected from the group consisting of 2,5-dichlorophenoxyalkane carboxylic acids and aliphatic esters thereof in an organic polar solvent therefor, selected from the group consisting of nitrobenzene and acetic acid, and introducing chlorine into said solution in an amount sufficient to replace one of the nuclear hydrogens in said aromatic compound with chlorine, to form thereby the corresponding 2,4,5-trichlorinated derivative.

2. A method of producing 2,4,5-trichlorophenoxyalkane carboxylic acids and alkyl esters thereof as claimed in claim 1 in which the organic polar solvent is acetic acid.

3. A method of producing 2,4,5-trichlorophenoxyalkane carboxylic acids and alkyl esters thereof as claimed in claim 1 in which the organic polar solvent is nitrobenzene.

References Cited in the file of this patent

UNITED STATES PATENTS

| | | |
|---|---|---|
| 2,665,314 | Krantz | Jan. 5, 1954 |
| 2,717,907 | Orwoll | Sept. 13, 1955 |

FOREIGN PATENTS

| | | |
|---|---|---|
| 607,113 | Great Britain | Aug. 25, 1948 |

OTHER REFERENCES

Haskelberg: Journal Org. Chem., vol. 12, pp. 426–433, May 1947.
Galat: J. A. C. S., vol. 74, pp. 3890–1 (1952).
Aoyagi: Chem. Ab., vol 47, col. 4911 (1953).